(12) United States Patent
Erickson

(10) Patent No.: US 7,961,630 B2
(45) Date of Patent: Jun. 14, 2011

(54) METHODS AND APPARATUS FOR STIMULATING PACKET-BASED SYSTEMS

(75) Inventor: Bruce Alan Erickson, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 412 days.

(21) Appl. No.: 11/904,416

(22) Filed: Sep. 27, 2007

(65) Prior Publication Data

US 2009/0086749 A1    Apr. 2, 2009

(51) Int. Cl.
*G01R 31/08* (2006.01)

(52) U.S. Cl. .................................................. 370/241

(58) Field of Classification Search ............ 370/230, 370/231–235, 241, 241.1, 242–255, 294.5, 370/357–362, 412–420
See application file for complete search history.

(56) References Cited

U.S. PATENT DOCUMENTS

| | | | |
|---|---|---|---|
| 6,028,847 A * | 2/2000 | Beanland | 370/252 |
| 6,950,405 B2 * | 9/2005 | Van Gerrevink | 370/252 |
| 7,092,360 B2 * | 8/2006 | Saint-Hilaire et al. | 370/241 |
| 7,382,725 B1 * | 6/2008 | Kakadia | 370/230 |
| 7,385,997 B2 * | 6/2008 | Gorti et al. | 370/415 |
| 7,394,836 B2 * | 7/2008 | Ko et al. | 370/537 |
| 2001/0048690 A1 * | 12/2001 | Magill et al. | 370/415 |
| 2002/0080796 A1 * | 6/2002 | Matsuoka et al. | 370/395.4 |
| 2002/0145974 A1 * | 10/2002 | Saidi et al. | 370/230 |
| 2002/0163922 A1 * | 11/2002 | Dooley et al. | 370/412 |
| 2003/0110286 A1 * | 6/2003 | Antal et al. | 709/236 |
| 2004/0071144 A1 * | 4/2004 | Beeri et al. | 370/395.4 |
| 2004/0114516 A1 * | 6/2004 | Iwata et al. | 370/230.1 |
| 2006/0146706 A1 * | 7/2006 | Nielsen | 370/230 |
| 2007/0081471 A1 * | 4/2007 | Talley et al. | 370/252 |
| 2007/0293984 A1 * | 12/2007 | Lin et al. | 700/245 |
| 2008/0008203 A1 * | 1/2008 | Frankkila et al. | 370/412 |

* cited by examiner

*Primary Examiner* — Kwang B Yao
*Assistant Examiner* — Jung Liu

(57) ABSTRACT

In one embodiment, a packet-based system having a number of buses is stimulated using apparatus having 1) a hardware interface configured to provide data packets to the buses; 2) a plurality of hardware-based queue schedulers, each configured to schedule data packets received from a respective one of a plurality of data packet sources, in a respective one of a plurality of hardware-based queues; and 3) a hardware-based priority scheduler configured to cause each particular queue to transmit a next highest priority data packet over one of the buses, based on i) timing requirements of the next highest priority data packet in the particular queue, and ii) a determination that transmission of the next highest priority data packet in the particular queue will not delay a transmission of a higher priority data packet in another one of the hardware-based queues.

20 Claims, 5 Drawing Sheets

| Constants (do not change over time, but change with each new DUT setup) | |
| --- | --- |
| Poptime | Time it takes for the receiver to consume a packet. |
| Maxpackets | Maximum number of packets that the DUT can have outstanding (the depth of the FIFO). A zero (0) means DUT has no FIFO. |
| Maxemptytime | Maximum time the DUT FIFO can be empty. |
| Minemptytime | Minimum time the DUT FIFO can be empty. |
| Maxpktperqueue | Maximum number of packets for a DUT's queue. |
| Queuetime | Time period for when maxpackets may be sent. Used when a DUT's queue is filled prior to processing packets from the queue. |
| Variables | |
| Numinfifo | Number of packets that have been sent and not yet consumed. |
| Timetosend | Time before the start of sending a packet from the queue. |
| Consumetimer | Time before receiver consumed the next packet in its FIFO. |

FIG. 4

METHODS AND APPARATUS FOR STIMULATING PACKET-BASED SYSTEMS

BACKGROUND

Computing systems often comprise a number of devices that communicate with each other over a number of buses. Numerous bus protocols are known, and each protocol typically specifies the physical and electrical characteristics of a bus, as well as the format in which data is expected to be transferred over the bus.

To ensure that a computing system operates properly, the system must be tested. In a system where devices are coupled to each other via a bus, both the devices and the bus must be tested. One way to test such a system is by stimulating the bus (e.g., by transmitting data over the bus), and then determining whether one or more of the devices that are connected to the bus can read, assemble and/or respond to the transmitted data. In this way, both the devices, and the bus that connects them, may be tested.

Some bus protocols specify that data be transmitted in data "packets"; and computing systems comprised of a plurality of devices that are coupled via such a bus are referred to as packet-based systems. Although various ways of testing the operation and performance of packet-based systems already exist, new and better ways of testing such systems are always being sought.

BRIEF DESCRIPTION OF THE DRAWINGS

Illustrative embodiments of the invention are illustrated in the drawings, in which:

FIG. 4 provides an exemplary table of timing constants and variables that may be used by ones of the hardware-based queue schedulers and hardware-based priority scheduler shown in FIG. 3.

DETAILED DESCRIPTION

Figure 1:
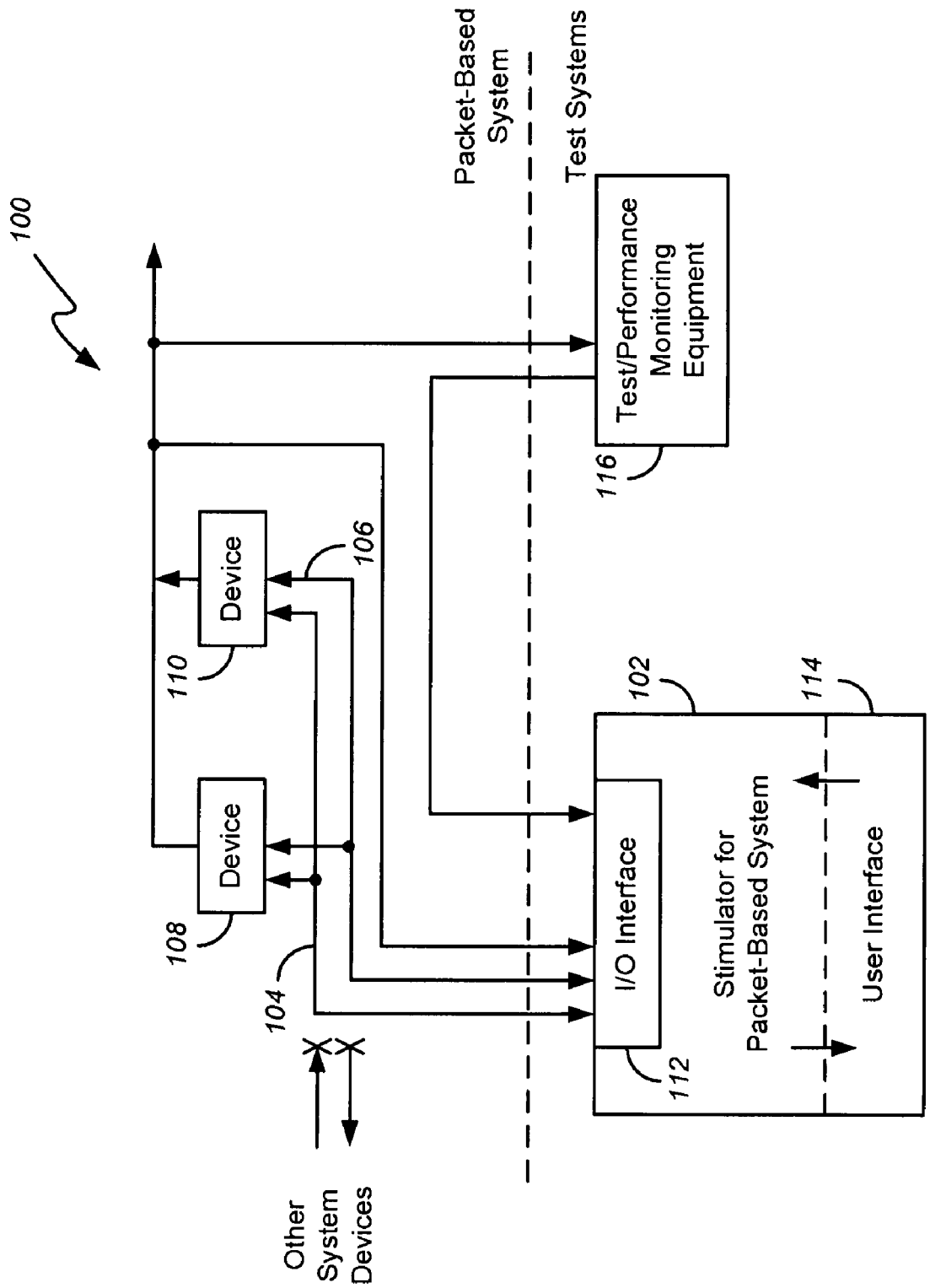
FIG. 1 illustrates an exemplary packet-based system, coupled to apparatus for stimulating the packet-based system.

FIG. 1 illustrates an exemplary packet-based system 100. By way of example, the system 100 is shown to comprise a plurality of packet-based data buses 104, 106, and a plurality of devices 108, 110 that are connected to the packet-based data buses 104, 106. The devices 108, 110 may take various forms, including those that simply pass or route data packets, and those that more actively read, assemble and/or respond to data packets. Smarter ones of the devices 108, 110 may include, for example, a cache memory for temporarily storing data packets, and a processor for decoding or consuming the data contained in the data packets.

A packet-based system 100, in general, is a system in which data is encapsulated and transmitted between a plurality of devices 108, 110 in the form of a plurality of "data packets". A packet-based protocol may dictate: how the data packets should be formed; how and when the data packets should be transmitted; and how and when the devices 108, 110 connected to a bus 104 or 106 should expect to receive the data packets. Examples of some specific packet-based protocols are PCI Express, Serial ATA and DigRF.

Although FIG. 1 illustrates a packet-based system 100 having a plurality of packet-based data buses 104, 106, the system 100 could alternately have only one data bus. Furthermore, all the buses 104 and 106 are sometimes referred to herein as "data buses", it is noted that the "data" carried on the buses 104 and 106 may variously comprise data, instructions or control signals.

As also shown in FIG. 1, the system 100 may be connected to apparatus 102 for stimulating the packet-based system 100. The apparatus 102 (i.e., a stimulator) comprises a hardware interface 112 (e.g., an input/output (I/O) interface) that is configured to provide data packets to the data bus 104. By providing data packets to the number of buses 104, 106, the apparatus 102 may stimulate both the buses 104, 106, as well as the devices 108, 110 that are connected to the buses 104, 106.

The system 100 may also be polled by the apparatus 102, via the hardware interface 112, to determine its makeup and requirements. The hardware interface 112 may also receive feedback from the system 100 (e.g., from the system 100 itself, or from test/performance monitoring equipment 116 that monitors the system 100).

The apparatus 102 may further comprise a user interface 114, which may take the form of a graphical user interface (GUI) that is displayed directly by the apparatus 102, or via a computer and/or display screen that is connected to the apparatus 102 (possibly over a network). Alternately, the user interface 114 may take the form of an "embedded system" interface that only interacts with other computer interfaces (e.g., an interface for electronically receiving programming instructions or reporting results).

FIG. 1 also illustrates how test/performance monitoring equipment 116 may be connected to both the packet-based system 100 (including, e.g., either or both of the data buses 104, 106 and the devices 108, 110) and the apparatus 102 (including, e.g., the hardware interface 112). Feedback from the test/performance monitoring equipment 116 may be provided to the apparatus 102, via the hardware interface 112, so that the apparatus 102 may alter its transmission of data packets over the data bus 104 in response to the feedback. Some examples of the types of feedback that the equipment 114 may provide will be discussed later in this description.

In the past, apparatus for stimulating a packet-based system has typically included a pattern generator, coupled with a program that "seeds" the pattern generator. As a result, relatively few variables, essentially limited to such things as time-between-packets, looping, branching, and wait states, could be controlled during packet generation. However, it would be useful to control other variables during packet generation, and thereby transmit packets that test things such as: how a packet-based system handles data packets sent at various time intervals; how a packet-based system handles interleaved packets; or how a packet-based system reacts to legal packets sent at illegal times.

There are also various types or conditions of packet-based systems for which more control over packet generation would be desirable. For example, some packet-based systems, such as those complying with the DigRF V3.07 or later protocols, require the transmission of data packets at various real-time intervals. For such systems, it would be useful if the apparatus 102 could provide the necessary real-time packets at appropriate times, and possibly in response to feedback from the packet-based system 100 under test.

Some packet-based devices also have a receiver with a queue (e.g., a first-in, first-out (FIFO) queue) that needs to be filled, prior to the device receiving a data packet such as the Digital BaseBand/RF Interface (DigRF) V3.07 "Time Accurate Strobe" packet, which causes the device to begin processing the packets in the device's queue. For these systems, it would be useful if the apparatus 102 could provide packets in the right number, and at the right time, to properly test such devices.

In still other cases, a user might want to send a special packet such as a "read register" packet. The user might want to send such packets at periodic times, upon certain conditions, once, or at random. Again, it would be useful if the apparatus 102 could handle such requests, and provide the user-requested packets to a packet-based system in such a manner that they do not violate a particular packet-based protocol.

Figure 2:
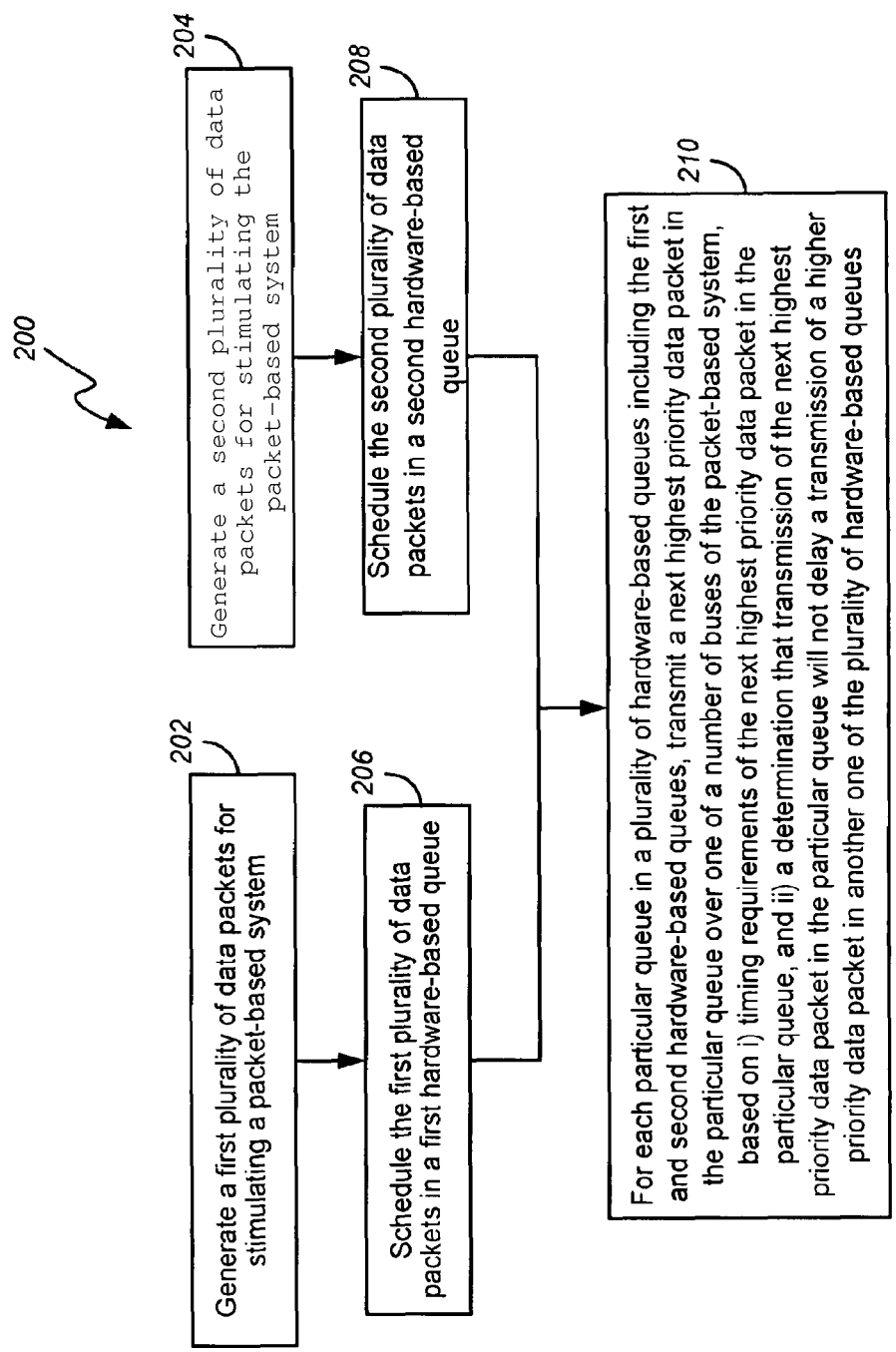
FIG. 2 illustrates an exemplary method for stimulating a packet-based system.

To provide more flexibility over the control of how data packets are provided to a packet-based system, FIG. 2 illustrates an exemplary new method 200 for stimulating a packet-based system. The method 200 comprises respectively generating first and second pluralities of data packets for stimulating the packet-based system (at blocks 202, 204). As or after the first and second pluralities of data packets are generated, they are scheduled in respective first and second hardware-based queues (at block 206, 208). The packet-based system is stimulated (at block 210) by, for each particular queue in a plurality of hardware-based queues including the first and second hardware-based queues, transmitting a next highest priority data packet in the particular queue, via a hardware-based priority scheduler, over one of the number of buses. A next highest priority data packet in a particular queue is transmitted based on i) timing requirements of the next highest priority data packet, and ii) a determination that transmission of the next highest priority data packet in the particular queue will not delay a transmission of a higher priority data packet in another one of the plurality of hardware-based queues. The queue schedulers and priority scheduler are based in hardware so that the method 200 can schedule and transmit data packets to the packet-based system in real-time. By way of example, the hardware basis for the queue schedulers and priority scheduler may be a field-programmable gate array (FPGA) or other programmed electrical circuit.

The timing requirements of a next highest priority data packet, or any other data packet scheduled in the plurality of hardware-based queues, may comprise both i) a scheduled send start time, and ii) a send duration. The scheduled send start time may be an absolute start time or a relative start time (e.g., a time based on the transmission or receipt of another data packet, or a time based on the occurrence of a particular condition or event). The send duration may be a time it takes to transmit a particular data packet.

In some embodiments of the method 200, a next highest priority data packet in a particular queue may be further transmitted over one of the buses based on a requirement of the packet-based system, such as a requirement that data packets be sent over a bus at a certain rate, or a requirement that data packets be sent in sufficient number to fill a queue of one of the packet-based system's devices. In the same or different embodiments of the method 200, a next highest priority data packet in a particular queue may also be transmitted over one of the buses based on feedback from the packet-based system, such as feedback regarding the transmission times of data packets, or feedback regarding when data packets are delivered or consumed.

The method 200 may transmit data packets over one or plural buses of a packet-based system. If data packets are transmitted over plural buses, the method 200 may transmit a next highest data packet in a particular queue over one of the buses, in coordination with one or more data packets transmitted over one or more other ones of the plural buses.

The method 200 may schedule data packets in the first or second hardware-based queue (or any of the plurality of hardware-based queues) based on various factors, including, for example, timing requirements associated with individual data packets or one or more requirements of a packet-based system.

In some embodiments of the method 200, the first and second pluralities of data packets may be respectively generated using different data packet generation methodologies. Exemplary ones of these methodologies are implemented by the data packet sources discussed later in this description.

In some cases, ones of the hardware-based queues from which data packets are transmitted are assigned priorities. In these cases, the method 200 may determine whether transmission of a next highest priority data packet in a particular queue will delay a transmission of a higher priority data packet based, at least in part, on whether another queue (which has data packets to transmit) has been assigned a higher priority than the particular queue.

Of note, the first and second hardware-based queues generated by the method 200 may be of any length, and may be 1) queues that are generated in full, prior to their merger, or 2) queues of few or many data packets, whose packets are dynamically consumed as the queues are appended to.

Figure 3:
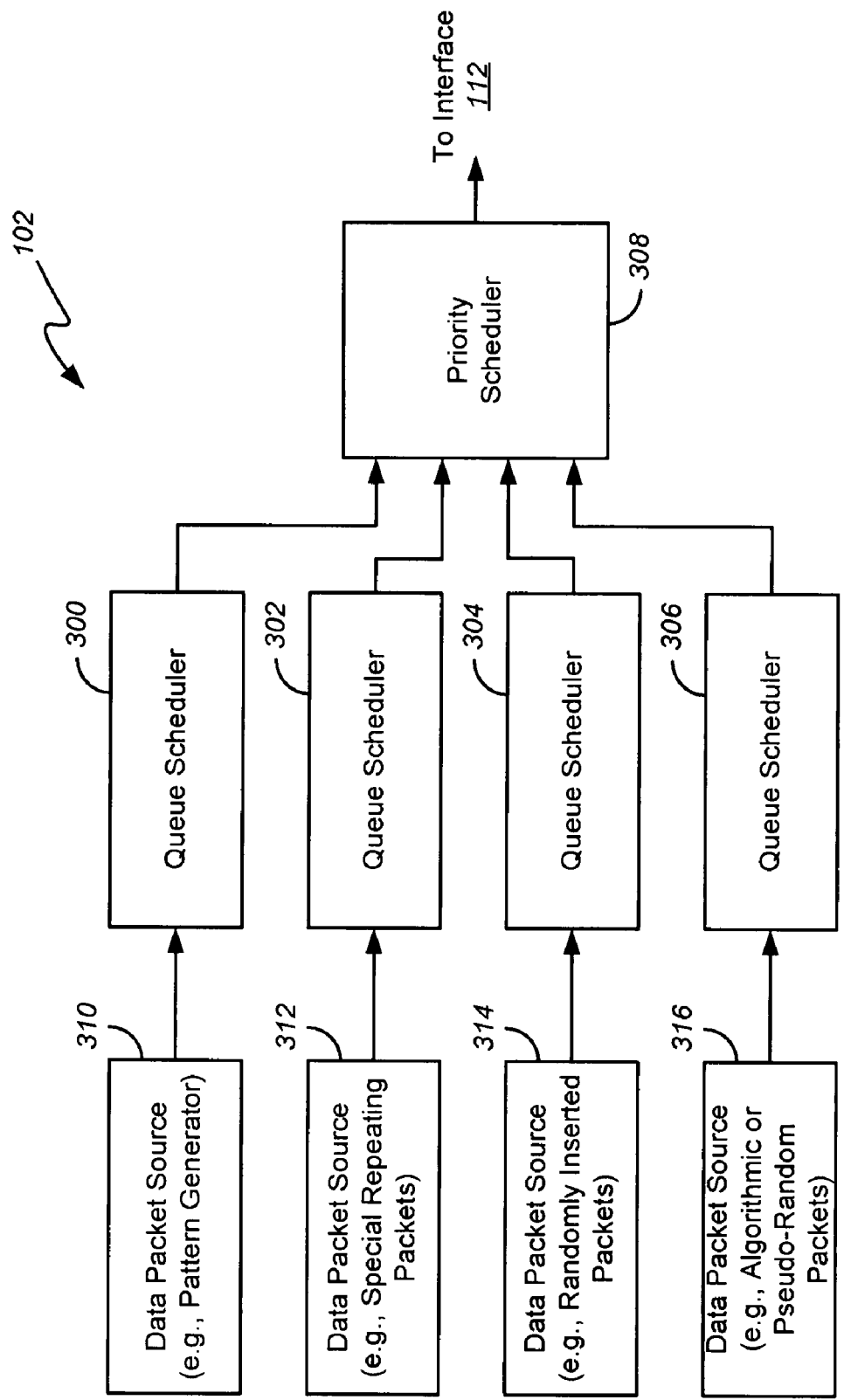
FIG. 3 illustrates an exemplary embodiment of various components of the stimulator apparatus shown in FIG. 1, wherein the components include a plurality of hardware-based queue schedulers, and a hardware-based priority scheduler, for providing data packets to the packet-based system shown in FIG. 1.

The method 200 can be useful in that it enables the generation of data packets in accord with different data packet generation methodologies, or for different purposes. The differently generated packets can then be separately queued, taking into account the different timing requirements and different dependencies of the different sets of packets. The data packets in the different queues can then be merged into a single queue for delivery to a packet-based system under test, or the data packets of different queues may be transmitted in a coordinated (e.g., synchronized) manner over different ones of a plurality of buses, for example the buses 104, 106. In other words, one of the queue schedulers 300, 302, 304, 306 can schedule data packets to one of the buses 104, 106, while another one of the queue schedulers 300, 302, 304, 306 can schedule data packets to be provided to another one of the buses 104, 106. FIG. 3 and paragraphs 32-36 below describe the types of data packets scheduled by the queue schedulers to be provided to the buses. The process that determines which data packets are to be transmitted may 1) consider the timing requirements of packets in different queues, the priorities of different queues, and the static and dynamic requirements or characteristics of a packet-based system, and then 2) transmit next highest priority ones of the packets in a manner that intentionally complies (or does not comply) with the requirements of the packet-based system.

FIG. 3 illustrates an exemplary embodiment of the stimulator apparatus 102 shown in FIG. 1, as it may be configured to implement different embodiments of the method 200 shown in FIG. 2. The components of the stimulator 102 comprise 1) the hardware interface 112; 2) a plurality of hardware-based queue schedulers 300, 302, 304, 306, each of which is configured to schedule, in a respective one of a plurality of queues, data packets received from a respective one of a plurality of data packet sources 310, 312, 314, 316; and 3) a hardware-based priority scheduler 308. The hardware-based priority scheduler 308 is configured to cause each particular queue in the plurality of queues 300, 302, 304, 306 to transmit a next highest priority data packet over one of a packet-based system's buses 104, 106 (FIG. 1). A next highest priority packet is transmitted based on i) timing requirements of the data packet, and ii) a determination that transmission of the data packet will not delay a transmission of a higher priority data packet in another queue.

The data packet sources 310, 312, 314, 316 may include, for example: one or more pattern generators, a user interface 114 through which a user may define data packets, or various combinations of hardware, software and/or users for supplying data packets.

FIG. 3 illustrates one exemplary combination of data packet sources 310, 312, 314, 316 and hardware-based queue schedulers 300, 302, 304, 306. The exemplary combination comprises four data packet sources 310, 312, 314, 316, each of which feeds a respective one of four hardware-based queue schedulers 300, 302, 304, 306. However, more or fewer packet sources 310, 312, 314, 316 and hardware-based queue schedulers 300, 302, 304, 306 could be provided, and the types and identities of the packet sources 310, 312, 314, 316 could vary.

By way of example, the first exemplary data packet source 310 shown in FIG. 3 is a pattern generator, such as a pattern generator that is seeded under control of a user-defined program. The user-defined program may provide both payload and header information for the data packets generated by the pattern generator. In some cases, the packets generated by the pattern generator may be replayed, with looping, wait states, and/or branching. Upon receiving data packets from the packet source 310, the hardware-based queue scheduler 300 schedules data packets according to a pattern of data packets that is to be provided to the data bus 104 or 106.

The second exemplary data packet source 312 is configured to generate special repeating data packets that are either 1) required to be transmitted over a data bus 104 (e.g., as dictated by a bus protocol or the particular devices 108, 110 that are connected to the data bus 104), or 2) desired by a user (e.g., a test engineer). Similarly to the data packets generated by the packet source 310, a user may provide both payload and header information for the data packets generated by the packet source 312. In one embodiment, the packet source 312 may be used to generate packets required by a watchdog timer, such as packets that are sent every 100 microseconds, and whose transmission time and time-to-receipt are measured by the test/performance monitoring equipment 116. Upon receiving data packets from the packet source 312, the hardware-based queue scheduler 302 schedules the repeating data packets.

The third exemplary data packet source 314 shown in FIG. 3 is configured to generate data packets with random timings. A user may provide packet header information for these packets, as well as the algorithm for (or limitations on) randomly generating the timing or payloads for these packets. In one embodiment, the randomly-timed packets might comprise requests to read the contents of a particular device register. Upon receiving data packets from the packet source 314, the hardware-based queue scheduler 304 randomly schedules the data packets for delivery to the data bus 104 or 106.

The fourth exemplary data packet source 316 shown in FIG. 3 is an algorithmic packet generator, such as a pseudo-random packet generator that generates packets according to an algorithm defined by a user. In one embodiment, the data packets generated by the packet source 316 may be packets that have user-defined headers, but which have pseudo-randomly generated payloads or timings (including, for example, legal packets having random, illegal timings). Upon receiving data packets from the packet source 316, the hardware-based queue scheduler 306 schedules the data packets for delivery to the data bus 104 or 106.

The GUI 114 may provide a mechanism for a user to define the packet header information and packet payload information required by the data packet sources 310, 312, 314, 316.

Each of the hardware-based queue schedulers 300, 302, 304, 306 receives the data packets generated by a respective one of the data packet sources 310, 312, 314, 316 and schedules data packets in a respective queue in accord with any timing requirements associated with the hardware-based queue scheduler itself or the data packets that are received by the hardware-based queue scheduler. Data packets may also be scheduled in response to feedback received from the packet-based system 100. In one embodiment, each of the data packets received by one of the hardware-based queue schedulers 300, 302, 304, 306 may be scheduled in accord with any or all of the timing constants and variables (collectively referred to as "timing requirements") shown in FIG. 4.

As or after data packets are scheduled in a plurality of queues by the hardware-based queue schedulers 300, 302, 304, 306, the hardware-based priority scheduler 308 causes next highest priority ones of the data packets to be transmitted from the plurality of queues to the system 100 via the hardware interface 112.

Figure 5:
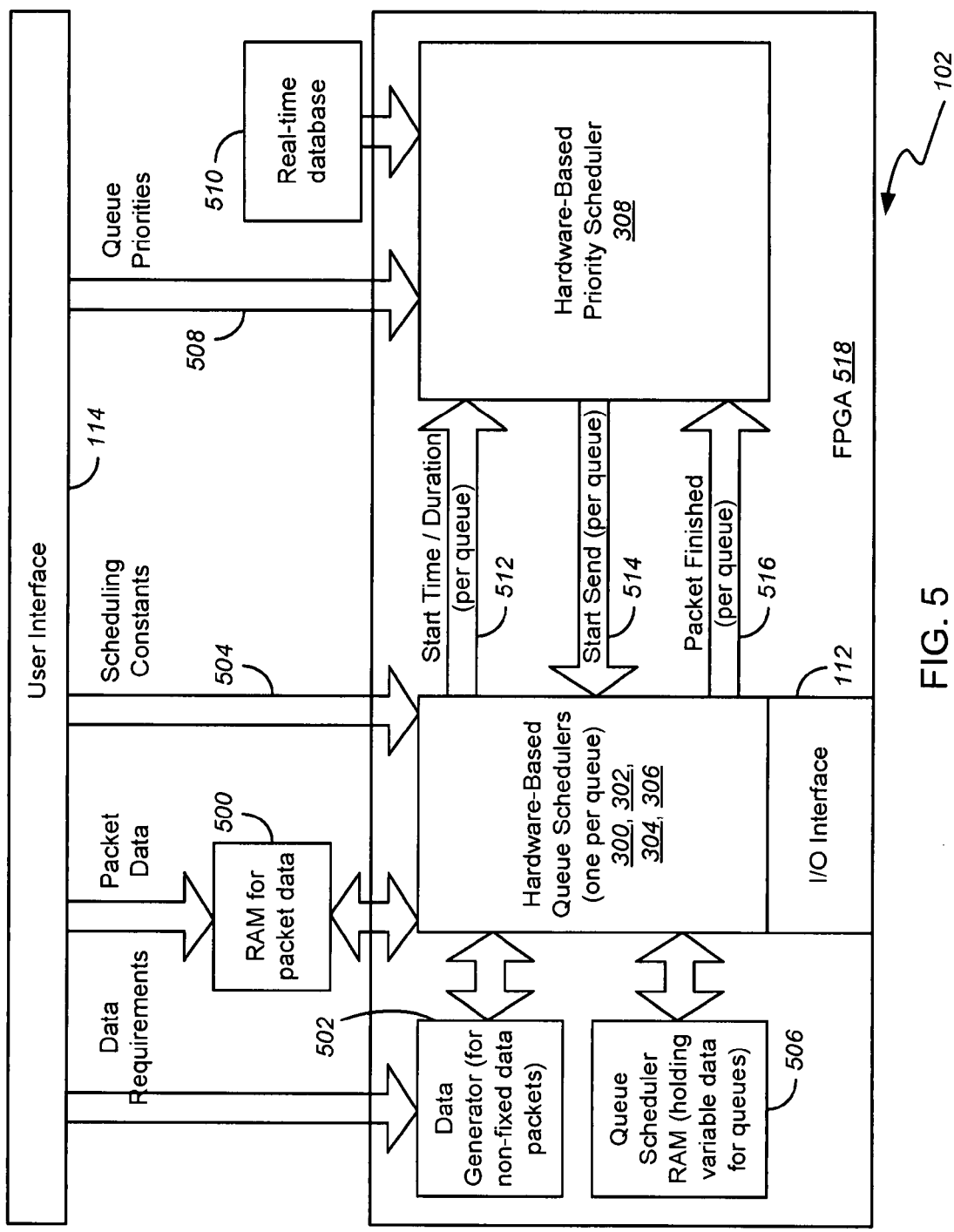
FIG. 5 illustrates an alternate configuration of the apparatus shown in FIG. 3.

FIG. 5 illustrates an alternate configuration of the apparatus shown in FIG. 3. As shown, data packets generated by the data sources 310 and 312 (FIG. 3) may be provided to the random access memory (RAM) 500 via the user interface 114, and data requirements for automatically and semi-automatically generated data packets may be provided to the data generator 502. The hardware-based queue schedulers 300, 302, 304, 306 may then receive data packets from the RAM 500 and data generator 502 and schedule the data packets in respective queues. The hardware-based queue schedulers 300, 302, 304, 306 may schedule the data packets based on constant data 504 received via the interface 114 and variable data received from the queue scheduler RAM 506.

The hardware-based priority scheduler 308 receives queue priorities 508 via the interface 114, and receives feedback from a packet-based system 100 (as stored in the real-time database 510). The hardware-based priority scheduler 308 also receives packet timing requirements 512, such as send start times and send durations, from each of the hardware-based queue schedulers 300, 302, 304, 306. In response to this information, the hardware-based priority scheduler 308 sends appropriately timed "Start Send" commands 514 to each of the hardware-based queue schedulers 300, 302, 304, 306. In response to the "Start Send" commands, the hardware-based queue schedulers transmit their next highest priority data packets to a packet-based system 100 via the hardware interface 112.

Upon transmission of a data packet, each hardware-based queue scheduler 300, 302, 304, 306 sends a "Packet Finished" notification 516 to the hardware-based priority scheduler 308. The hardware-based priority scheduler 308 can then use this information to determine when it is okay to trigger the sending of one or more additional data packets.

In one embodiment, the hardware-based queue schedulers 300, 302, 304, 306, hardware-based priority scheduler 308, data generator 502 and queue scheduler RAM 506 may be implemented via a field-programmable gate array (FPGA).

Consider one exemplary use of the stimulator 102 shown in FIGS. 1, 3 & 5, wherein the data bus 104 is a packetized bus with a bandwidth of 1 Mbps (megabits per second), wherein the device 108 is a D/A (digital-to-analog) converter that requires 16-bit data packets at the rate of 800 kbps, and wherein the D/A converter has a FIFO buffer that is five packets deep (with a requirement that the FIFO not be starved or overflowed). Furthermore, a test engineer desires to 1)

implement a watchdog timer that requires a special 8-bit packet every 100 (+/−1) microseconds, and 2) perform a register read once per second. In such a configuration of the system 100 (FIG. 1), the data source 310 may generate the 16-bit data packets, and the hardware-based queue scheduler 300 may schedule the 16-bit data packets. The data source 312 may generate data packets for the watchdog timer, and the hardware-based queue scheduler 302 may schedule these packets. The data source 314 may generate the register read packets, and the hardware-based queue scheduler 304 may schedule these packets.

Continuing with the example started in the previous paragraph, and in one embodiment, the hardware-based priority scheduler 308 may poll the system 100 to determine the protocol of the data bus 104, as well as the identities and requirements of the devices 108, 110 that are connected to the data bus 104. In another embodiment, the hardware-based priority scheduler 308 may receive information regarding the requirements of the bus 104 and devices 108, 110 via the user interface 114. The hardware-based priority scheduler 308 may also receive feedback for the system 100 via the test/performance monitoring equipment 116. In response to all of this information, the hardware-based priority scheduler 308 may retrieve data packets scheduled by the hardware-based queue schedulers 300, 302 and 304 and schedule the retrieved data packets in a single queue for delivery to the hardware interface 112.

What is claimed is:

1. A method for stimulating a packet-based system having a number of buses, comprising:
   generating a first plurality of data packets for stimulating the packet-based system;
   scheduling the first plurality of data packets in a first hardware-based queue;
   generating a second plurality of data packets for stimulating the packet-based system;
   scheduling the second plurality of data packets in a second hardware-based queue; and
   for each particular queue in a plurality of hardware-based queues including the first and second hardware-based queues, transmitting a next highest priority data packet in the particular queue, via a hardware-based scheduler, over one of the number of buses, based on i) timing requirements of the next highest priority data packet in the particular queue, and ii) a determination that transmission of the next highest priority data packet in the particular queue will not delay a transmission of a higher priority data packet in another one of the plurality of queues;
      wherein the first and second pluralities of data packets are respectively generated using first and second data packet generation methodologies, wherein the first data packet generation methodology differs from the second data packet generation methodology.

2. The method of claim 1, wherein the next highest priority data packet in the particular queue is further transmitted over the one of the number of buses based on a requirement of the packet-based system.

3. The method of claim 1, wherein the next highest priority data packet in the particular queue is further transmitted over the one of the number of buses based on feedback from the packet-based system.

4. The method of claim 1, wherein the number of buses comprises a plurality of buses, and wherein the method further comprises transmitting the next highest data packet over the one of the number of buses in coordination with one or more data packets transmitted over one or more other ones of the plurality of buses.

5. The method of claim 1, wherein timing requirements of the next highest priority data packet in the particular queue comprise both i) a scheduled send start time, and ii) a send duration.

6. The method of claim 1, wherein ones of the plurality of hardware-based queues are assigned priorities, and wherein the determination that transmission of the next highest priority data packet in the particular queue will not delay a transmission of a higher priority data packet in another one of the plurality of hardware-based queues is made, at least in part, based on the assigned priorities of the hardware-based queues.

7. The method of claim 1, further comprising, scheduling at least some of the data packets, in the first or second queue, based on timing requirements associated with the at least some data packets.

8. The method of claim 1, further comprising, scheduling at least some of the data packets, in the first or second queue, based on a requirement of the packet-based system.

9. Apparatus for stimulating a packet-based system having a number of buses, comprising:
   a hardware interface configured to provide data packets to the number of buses, to stimulate the packet-based system;
   a plurality of hardware-based queue schedulers, each configured to schedule data packets received from a respective one of a plurality of data packet sources, in a respective one of a plurality of hardware-based queues; and
   a hardware-based priority scheduler configured to cause each particular queue in the plurality of hardware-based queues to transmit a next highest priority data packet in the particular queue over one of the number of buses, based on i) timing requirements of the next highest priority data packet in the particular queue, and ii) a determination that transmission of the next highest priority data packet in the particular queue will not delay a transmission of a higher priority data packet in another one of the plurality of hardware-based queues;
      wherein different ones of the plurality of hardware-based queue schedulers are configured to schedule data packets that are generated using different data packet generation methodologies.

10. The apparatus of claim 9, wherein the hardware-based priority scheduler further causes the next highest priority data packet in the particular queue to be transmitted over the one of the number of buses based on a requirement of the packet-based system.

11. The apparatus of claim 9, wherein the hardware-based priority scheduler further causes the next highest priority data packet in the particular queue to be transmitted over the one of the number of buses based on feedback from the packet-based system.

12. The apparatus of claim 9, wherein the number of buses to which the hardware interface is configured to provide the data packets comprises a plurality of buses, and wherein the hardware-based priority scheduler further causes the next highest data packet to be transmitted over the one of the number of buses in coordination with one or more data packets transmitted over one or more other ones of the plurality of buses.

13. The apparatus of claim 9, wherein timing requirements of the next highest priority data packet in the particular queue comprise both a scheduled send start time and a scheduled send duration, and wherein the hardware-based priority scheduler determines whether transmission of the next highest priority data packet in the particular queue will delay a transmission of a higher priority data packet in another one of the plurality of hardware-based queues based, at least in part, on said timing requirements of the at least some data packets.

14. The apparatus of claim 9, wherein the hardware-based priority scheduler receives assigned priorities of ones of the plurality of hardware-based queues, and wherein the hardware-based priority scheduler determines whether transmission of the next highest priority data packet in the particular queue will delay a transmission of a higher priority data packet in another one of the plurality of hardware-based queues based, at least in part, on the assigned priorities of the hardware-based queues.

15. The apparatus of claim 9, wherein at least one of the hardware-based queue schedulers schedules at least some of the data packets based on timing requirements associated with the at least some data packets.

16. The apparatus of claim 9, further comprising a field-programmable gate array configured to provide the hardware interface, the plurality of hardware-based queue schedulers, and the hardware-based priority scheduler.

17. The apparatus of claim 9, wherein the plurality of hardware-based queue schedulers comprises:
a first hardware-based queue scheduler that schedules data packets according to a pattern of data packets that is to be provided to one of the number of buses; and
a second hardware-based queue scheduler that schedules repeating data packets that are to be provided to another one of the number of buses.

18. The apparatus of claim 9, wherein the plurality of hardware-based queue schedulers comprises:
a first hardware-based queue scheduler that schedules data packets according to a pattern of data packets that is to be provided to one of the number of buses; and
a second hardware-based queue scheduler that randomly schedules data packets that are to be provided to another one of the number of buses.

19. The apparatus of claim 9, wherein the plurality of hardware-based queue schedulers comprises:
a first hardware-based queue scheduler that schedules data packets according to a pattern of data packets that is to be provided to one of the number of buses; and
a second hardware-based queue scheduler that schedules data packets with pseudo-random payloads that are to be provided to another one of the number of buses.

20. The apparatus of claim 9, further comprising a graphical user interface (GUI), wherein the GUI provides a mechanism for a user to define packet header information and packet payload information for the data packets provided by one or more of the plurality of data packet sources.

* * * * *